Sept. 23, 1958 G. CAMILLI ET AL 2,853,540
GAS INSULATED ELECTRICAL APPARATUS
Filed Jan. 6, 1954 3 Sheets-Sheet 1

Inventors
Guglielmo Camilli,
Tseng W. Liao,
Ralph E. Plump,
by Gilbert P. Tarleton
Their Attorney.

Sept. 23, 1958  G. CAMILLI ET AL  2,853,540
GAS INSULATED ELECTRICAL APPARATUS
Filed Jan. 6, 1954  3 Sheets-Sheet 2

Inventors
Guglielmo Camilli,
Tseng W. Liao,
Ralph E. Plump,
by Gilbert P. Tarleton
Their Attorney.

United States Patent Office 2,853,540
Patented Sept. 23, 1958

2,853,540

GAS INSULATED ELECTRICAL APPARATUS

Guglielmo Camilli, Tseng W. Liao, and Ralph E. Plump, Pittsfield, Mass., assignors to General Electric Company, a corporation of New York Application January 6, 1954, Serial No. 402,446

10 Claims. (Cl. 174—17)

The present invention relates to gas insulated electrical apparatus. More particularly, the invention is concerned with electrical transformers containing a gas mixture having improved electrical properties under non-uniform electrostatic field conditions.

This application is a continuation-in-part of our application Serial No. 347,542, filed April 8, 1953, now abandoned.

A relatively recent development in the transformer field is the so-called dry type transformer in which air, nitrogen, helium, and various halogenated hydrocarbon gases have been used or suggested for use as the cooling and insulating medium. Nitrogen and helium and mixtures of these gases were among the first to be employed as cooling and insulating mediums in the dry type transformer. For the purpose of improving the electrical properties of such gases, it was considered desirable to maintain the gases under pressure.

More recently, gaseous compounds containing combined fluorine have been considered for such applications. For example, Patent 2,221,670—Cooper described the use of the fluorine or fluorine and chlorine derivatives of methane and ethane as the insulating gas in electrical devices such as transformers. Cooper teaches that these electronegative gases have higher dielectric strengths than nitrogen and recommends that they be used under pressure for a further increase in the dielectric strength and other electrical properties. Cooper also suggests that if further increase in the operating pressures of the electrical device above the pressure at which the fluorinated gas liquifies is desired, this added pressure should be obtained by the addition of nitrogen. According to Cooper, the breakdown voltage of such a mixture for example with Freon 12 where the nitrogen is employed to obtain a pressure greater than 90 lbs. p. s. i. absolute will be only slightly higher than the breakdown voltage for the pure fluorinated or halogenated compounds.

When tested in a uniform electrostatic field the perfluorinated gaseous higher carbons such as octafluoropropane $C_3F_8$, the cyclic compound $C_4F_8$, and decafluorobutane $C_4F_{10}$ and also octafluorocyclobutyl ether-1,4, $C_4F_8O$, have even higher dielectric strengths than the lower halogenated hydrocarbons specifically described in the Cooper patent. For this reason these higher fluorinated hydrocarbons, in spite of their higher costs, have been considered for use as insulating gases in transformers and the like. Their selection has been primarily based on the dielectric strength and corona starting voltages of the gases under uniform electrostatic field conditions. In this connection, it should be noted that the use of the cyclic compound $C_4F_8$ (octafluorocyclobutane) per se as a gaseous transformer dielectric does not form a part of the present invention, such use being disclosed in copending application Serial No. 490,367—Wolfe, assigned to the same assignee as the present application.

However, in actual practice, as for example in a transformer application, the electrostatic fields are not all uniform and it has been found that the dielectric strengths of these perfluorinated hydrocarbons as well as sulfur hexafluoride in a non-uniform field do not increase with pressure as they do under uniform electrostatic field conditions, furthermore, it has been found that the dielectric strength of such gases in a non-uniform field does not follow the usual gas characteristics with regards to the expected increased dielectric strength for increased spacings between the electrodes generating the field.

The expression "non-uniform (electrostatic) field" as used herein is intended to refer to an electrical field between two electrodes wherein there is a non-uniform or non-proportional distribution of the electrical potential in the space between the two electrodes, as distinguished from a uniform field where the potential distribution is proportional with the spacing between the electrodes.

Thus, it is seen that while the usual tests in a uniform electrostatic field would dictate the use of sulfur hexafluoride or the completely fluorinated hydrocarbons containing three or four carbon atoms as the insulating and cooling gas in a dry type transformer, these electronegative gases, in their failure to follow the usual gas laws with regards to non-uniform fields, are not completely satisfactory for any electrical application involving a non-uniform field.

It is a primary object of the present invention to provide a gaseous dielectric for transformer and similar applications which possesses a high dielectric strength and other desirable electrical characteristics under both uniform and non-uniform electrostatic field conditions.

It is a further object of the invention to provide a gaseous dielectric medium containing an electro-negative fluorocompound having a dielectric strength which increases regularly both with increased pressure or increased electrode spacings under non-uniform field conditions.

A further object of the invention is to provide a mixed gas dielectric medium which is less expensive and has a lower boiling point or condensation point than the pure fluorinated electronegative gases.

Additional objects and features of the invention will become more apparent from a consideration of the following description when taken in connection with the accompanying drawing in which Fig. 1 is a vertical cross-sectional view schematically illustrating the essential features of a dry-type transformer to be charged with the gaseous mixtures of the present invention;

In accordance with the present invention there is provided an enclosed electrical apparatus containing a gaseous insulating medium possessing optimum electrical characteristics in both uniform and non-uniform electrostatic fields. The invention is based on the discovery that a mixture of gases consisting of nitrogen and a perfluorinated gaseous compound which may be $C_4F_8$, octafluoropropane, decafluorobutane, $SF_6$, or octafluorocyclobutyl ether-1,4, $C_4F_8O$, in which the nitrogen content is from 5 to 85% by volume possesses good electrical characteristics under uniform electrostatic field conditions and is superior to the pure fluorinated gases under non-uniform field conditions. A further advantage of the mixture is that it has a lower dew point, that is a lower condensation point, than the pure fluorocompound.

Figure 1:
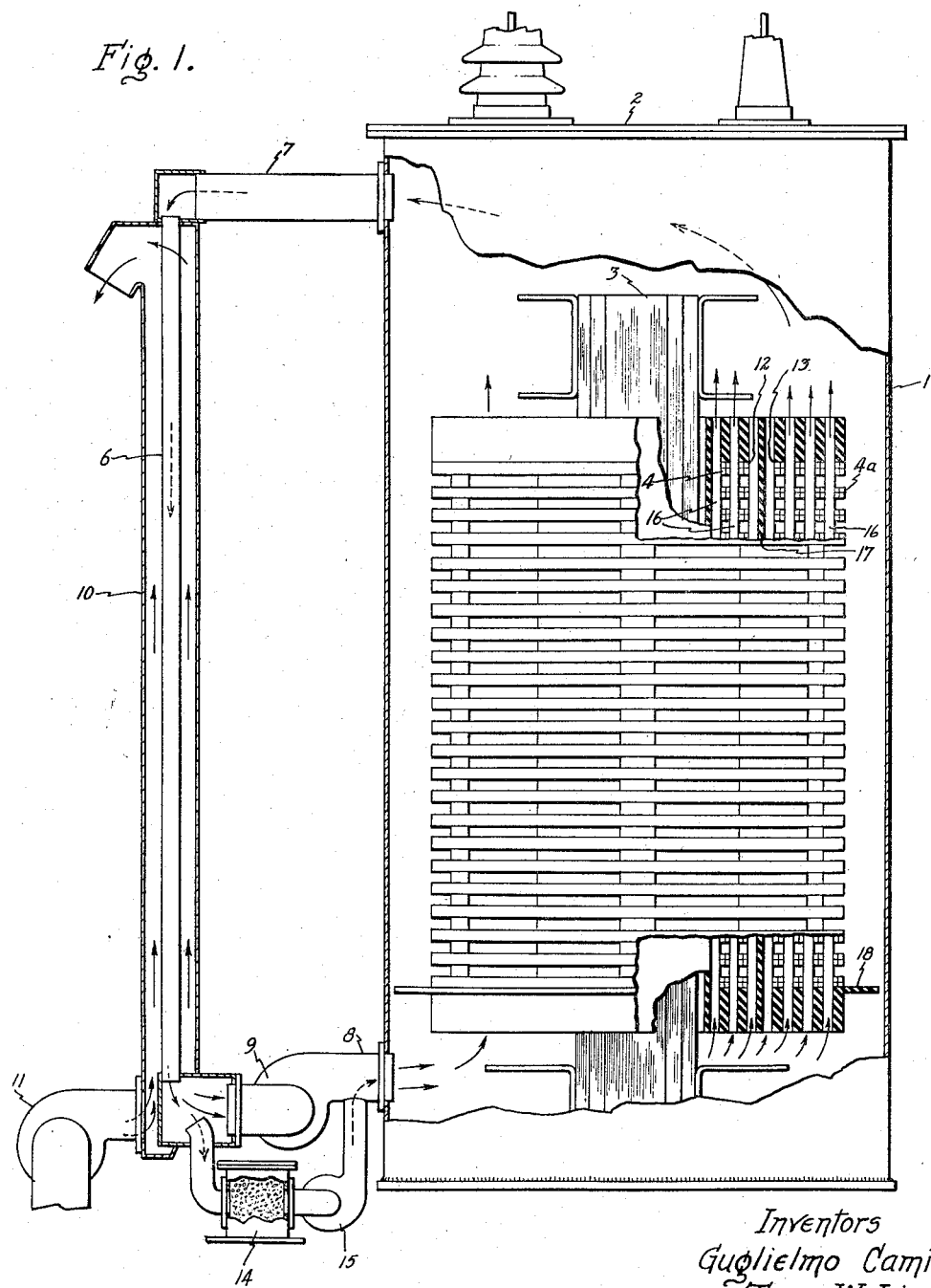

For the purpose of illustrating the application of the present invention there is shown somewhat schematically in Fig. 1 a transformer comprising a casing or container 1 sealed by means of a cover 2 so that it can be operated at from one to three atmospheres pressure.

Within the casing there is a magnetic core 3 around which a low voltage coil 4 and a high voltage coil 4a are positioned. As is the usual practice with the dry type or air cooled transformer the coils are open wound with adjacent layers separated by a plurality of circumferentially-spaced vertically-extending spacers 16 to facilitate the penetration of the cooling gas through the coil structures. The low voltage coil 4 is further insulated from the high voltage coil 4a by an insulating cylinder 17. To insure the flow of the gas circulating through the casing 1 through the coils a baffle 18 is positioned within the casing for the purpose of directing the gas moving through the casing through the coil structure. The baffle is preferably made of any suitable insulating material.

For the purpose of cooling the gaseous dielectric after it is passed through the coil structure there is provided a cooler unit 6 connected to the transformer casing 1.

In the modification shown the gaseous dielectric removed from the top of the transformer casing and carried into the cooler 6 by means of conduit 7 is reintroduced into the transformer casing adjacent the bottom portion thereof through conduit 8 including a fan 9 for promoting circulation of the gaseous dielectric. Ordinary air cooling will ordinarily be sufficient for maintaining the gaseous dielectric at the proper operating temperatures and if desired the cooling unit 6 may be surrounded by an air duct 10 through which air is continuously circulated in heat exchange relationship with cooler 6 by a fan 11.

The transformer also contains means for removing corrosive products in case of accidental arcing in the gas. Fourteen (14) is a container of granular absorbent, through which part of the total gas is continuously drawn by blower 15. The absorbent can be activated alumina, soda lime, or a mixture of these which we have discovered to be about twice as effective either alone, or in equal quantities. The reason for scrubbing only part of the gas is to allow for a maximum degree of circulation for cooling. The mutually complementary action of mixed soda-lime (previously exposed to humid air) and activated alumina is illustrated by the following facts: Twenty-eight minutes passed before a sensitive color change indicated that acid was finally getting through a 2 cc. column of 50-50 by volume, mixture. The same quantity of soda lime was effective for only 5 minutes, and alumina was effective for only ¾ minute. This experiment, with $SF_6$ blowing through a controlled arc was repeated with $C_4F_{10}$ with the following results: mixed soda-lime-alumina 13 minutes, soda-lime alone 8 minutes, alumina alone 5 minutes. These results are accountable on the bases of a variety of decomposition products in the arc for which one absorbent is more effective than the other. The two absorbents mixed, spare each other by removing the contaminant for which the other has less affinity.

It is known, of course, that due to the inherent construction of this type of electrical apparatus, there are set up within the casing 1 during the operation of the apparatus various electrostatic fields some of which may be substantially uniform but the major portion of which are essentially non-uniform as, for example, between the edges or ends 12 and 13 of the low and high voltage coils. Likewise, these electrostatic fields are defined by or exist between points of different shape and different potential which are spaced various distances apart. Particularly in high voltage equipment, the points which may be thought of as electrodes of different potentials are spaced at distances which are ordinarily at least one-fourth inch and generally well in excess of one inch.

The present invention is particularly concerned with this type of apparatus, that is apparatus in which there are non-uniform field conditions and in which the gap or spacing between the electrodes defining the non-uniform field is relatively large.

It has been found that mixtures of nitrogen and fluorinated compounds such as $SF_6$ or fluorinated hydrocarbons containing three or four carbon atoms possess unexpected advantages as the gaseous insulating media for such apparatus. While these gas mixtures possess no unusual or unexpected characteristics in a uniform field they show a substantial departure from the usual characteristics governing the behavior of gases in non-uniform fields.

Figure 2:
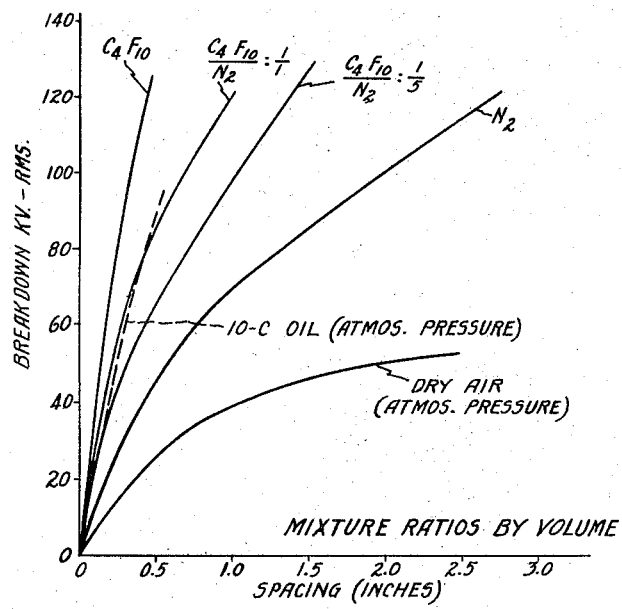
Fig. 2 is a graph plotting electric breakdown voltages for different electrode spacings in different gases under uniform field conditions.
Figure 3:
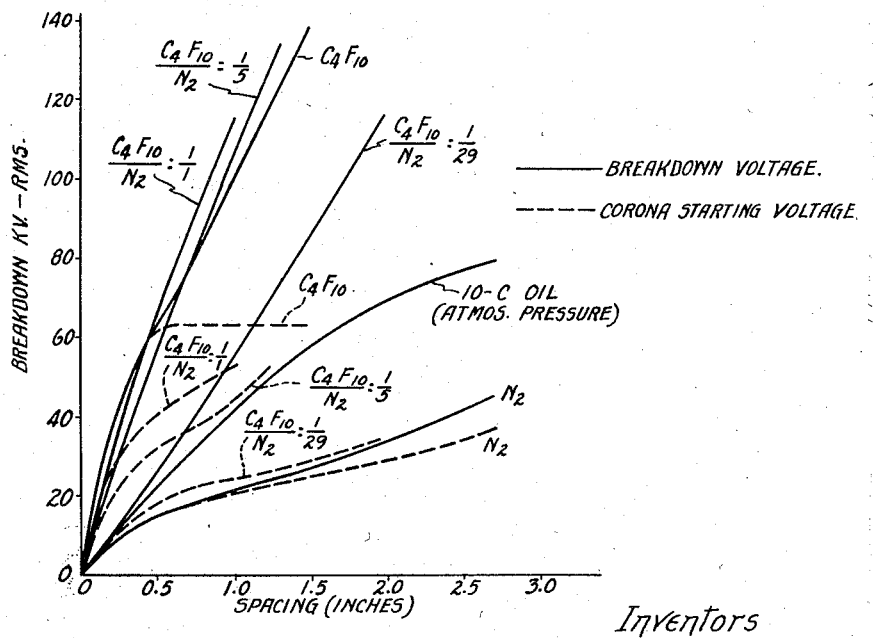
Fig. 3 is a similar graph plotting breakdown voltages and corona starting voltages for different gases with increased electrode spacings in a non-uniform electrostatic field.
Figure 4:
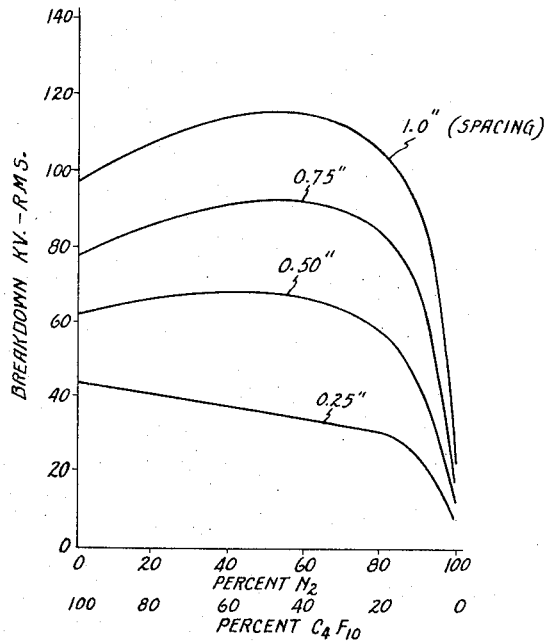
Fig. 4 is a graph in which are plotted breakdown voltages for different electrode spacings in a non-uniform field for different mixtures of gases.

The properties of some of these gas mixtures and of other gases under varying field conditions are plotted in Figs. 2 to 4 of the drawing. With reference to Fig. 2 it will be seen that the 60 cycle breakdown voltages for air, nitrogen, decafluorobutane and various volumetric mixtures of decafluorobutane and nitrogen increase with increased spacing in a uniform field between the electrodes which in this case were two parallel planes 3 inches in diameter. The test results plotted in Fig. 2 were obtained at a gas pressure of 15 pounds per sq. inch gage pressure or about 2 atmospheres absolute pressure. The increase in the breakdown voltage with increased spacings between the electrodes is that which would normally be expected from an insulating gas.

On the other hand, in a non-uniform field, as is shown by the test results plotted in Fig. 3 of the drawing, certain mixtures of decafluorobutane and nitrogen unexpectedly possess higher dielectric strengths at the wider gap spacings than either of the gases alone. The test results plotted in Fig. 3 were taken at a gage pressure of 15 p. s. i. employing a 3 inch diameter disk as the ground electrode and a ¼ inch square rod as the high potential electrode. From these test results it will be noted that certain mixtures of decafluorobutane and nitrogen have higher 60 cycle breakdown voltages than the pure gases at all electrode spacings above about 0.7 inch under non-uniform field conditions. Also plotted in Fig. 3 of the drawing are the corona starting voltages in dotted lines for the various gases and gas mixtures.

Figure 5:
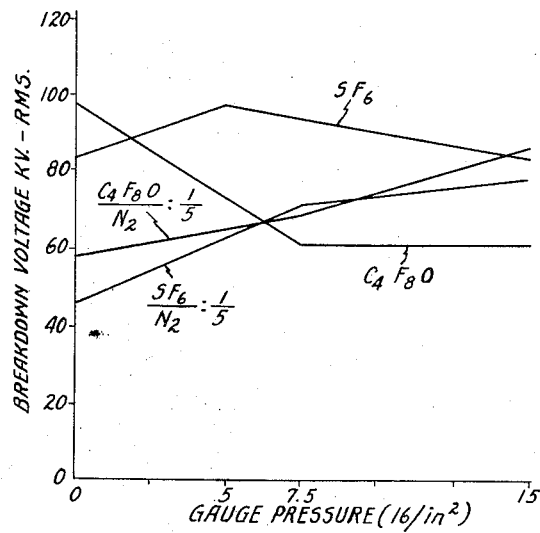
Fig. 5 is a graph plotting the breakdown voltages of certain gases and gas mixtures at different pressures in a non-uniform field.

The advantages of the gas mixtures under these non-uniform field conditions become more apparent from the graph shown in Fig. 4 of the drawing in which the 60 cycle breakdown voltages for four different gap spacings or distances are plotted against the composition of the nitrogen-decafluorobutane gaseous dielectrics. The curves for electrode spacing of 0.5 inch or more all have maxima with the highest breakdown voltages being obtained with the mixed gases rather than either of the pure gases alone. Similar results are obtained with the next lower member octafluoropropane, $C_3F_8$, and other fluoro compounds such as $c$-$C_4F_8O$ and $SF_6$ as shown in Fig. 5 in which the electrode spacings were one inch. In Fig. 5, it is seen that mixing nitrogen with $c$-$C_4F_8O$ has a very beneficial effect above the 6 p. s. i. g. The relatively uniform upward slope, in contrast with pure $c$-$C_4F_8O$, shows an advantage in dependability which the $c$-$C_4F_8O$ alone, lacks.

A further advantage of the gas mixtures is their lower boiling points. For example, whereas pure decafluorobutane condenses at about −2.5° C., a mixture of one part decafluorobutane and one part nitrogen condenses at −21° C. and a mixture of one part decafluorobutane and five parts nitrogen condenses at about −34° C., all of these condensation points referring to atmospheric total pressure. At 15 pounds gage pressure or about 2 atmospheres absolute pressure, pure decafluorobutane condenses at about +18.3° C. while a mixture of one part decafluorobutane and five parts nitrogen condenses at about −24° C. Similar results are obtained with the other electronegative gases. For example, while pure octafluoropropane at 15 pounds gage pressure condenses at −28° C. a mixture of one part of this gas with five parts nitrogen condenses at −54° C. Thus it is seen that the gas mixtures are particularly useful for transformer and other applications wherein the apparatus may be subjected to rather low temperatures in use. In such apparatus it is highly desirable that the gaseous dielectric remain in the gaseous state under all operating conditions.

Since certain changes in the disclosed embodiment of the invention can be made without departing from its scope, it is intended that all the matter in the above description is to be interpreted as illustrative only. For example, we have found that Freon 115, $C_2ClF_5$, also has a noteworthy response to the presence of nitrogen in a non-uniform field. The mixture surpasses in strength that of the undiluted F−115 at the pressures and in the gap distances under consideration in this invention.

What we claim as new and desire to secure by Letters Patent of the United States is:

1. An electrical apparatus comprising a closed container and electric device within said container of the type which during use creates a non-uniform electrastatic field within said container and having elements of different potential spaced from each other at least one-half inch and a gaseous dielectric filling said container and consisting essentially of a mixture of 5 to 85 percent by volume of nitrogen and 15 to 95 percent of a gas selected from the group consisting of sulfur hexafluoride and decafluorobutane, octafluoropropane, octafluorocyclobutyl ether-1,4, and octafluorocyclobutane.

2. An electrical apparatus of claim 1 in which the gas mixture contains decafluorobutane.

3. An electrical apparatus of claim 1 in which the gas mixture contains sulfur hexafluoride.

4. An electrical apparatus of claim 1 in which the gas mixture contains octafluorocyclobutyl ether-1,4.

5. An electrical apparatus comprising a closed container and electric device within said container of the type which during use creates a non-uniform electrostatic field within said container and having elements of different potential spaced from each other at least one-half inch and a gaseous dielectric filling said container and consisting essentially of a mixture of 5 to 85 percent by volume of nitrogen and 15 to 95 percent of octafluoropropane.

6. An electrical apparatus comprising a closed container, a transformer including elements which are spaced from one another a distance of at least one-half inch and between which a non-uniform electrostatic field exists during operation of said apparatus, a gaseous dielectric filling said container, a cooling unit connected to said container and means for circulating said gaseous dielectric through said container and said cooling unit, said gaseous dielectric consisting of a mixture of from 15 to 95 percent by volume of an electronegative completely fluorinated gaseous hydrocarbon containing from 3 to 4 carbon atoms and from 5 to 85 percent by volume of nitrogen at an absolute pressure of from one to four atmospheres.

7. An electrical apparatus comprising a closed container, a transformer including elements which are spaced from one another a distance of at least one-half inch and between which a non-uniform electrostatic field exists during operation of said apparatus, a gaseous dielectric filling said container, a cooling unit connected to said container and means for circulating said gaseous dielectric through said container and said cooling unit, said gaseous dielectric consisting of a mixture of from 15 to 95 percent by volume of decafluorobutane and from 5 to 85 percent by volume of nitrogen at an absolute pressure of from one to three atmospheres.

8. An electrical apparatus comprising a closed container, a transformer including high and low voltage elements which are spaced from one another a distance of at least one-half inch and between which a non-uniform electrostatic field exists during operation of said apparatus, a gaseous dielectric filling said container, a cooling unit connected to said container and means for circulating said gaseous dielectric through said container and said cooling unit, said gaseous dielectric consisting of a mixture of from 20 to 70 percent by volume of a completely fluorinated gaseous aliphatic hydrocarbon containing from 3 to 4 carbon atoms and from 30 to 80 percent by volume of nitrogen at an absolute pressure of from one to three atmospheres.

9. An electrical apparatus comprising a closed container, a transformer including elements which are spaced from one another a distance of at least one-half inch and between which a non-uniform electrostatic field exists during operation of said apparatus, a gaseous dielectric filling said container, a cooling unit connected to said container and means for circulating said gaseous dielectric through said container and said cooling unit, said gaseous dielectric consisting of a mixture of from 15 to 95 percent by volume of octafluoropropane and from 5 to 85 percent by volume of nitrogen at an absolute pressure of from one to three atmospheres.

10. An electrical apparatus comprising a closed container, a transformer including elements which are spaced from one another a distance of at least one-half inch and between which a non-uniform electrostatic field exists during operation of said apparatus, a gaseous dielectric filling said container, a cooling unit connected to said container, and means for circulating said gaseous dielectric through said container and said cooling unit, said gaseous dielectric consisting essentially of a mixture of 5–85 percent by volume of nitrogen, and 15–95 percent by volume of the cyclic compound $C_4F_8$.

References Cited in the file of this patent

UNITED STATES PATENTS

| | | |
|---|---|---|
| 1,334,041 | Lindstrom | Mar. 16, 1920 |
| 2,221,670 | Cooper | Nov. 12, 1940 |
| 2,221,671 | Cooper | Nov. 12, 1940 |
| 2,561,738 | Hill | Jan. 24, 1951 |

FOREIGN PATENTS

| | | |
|---|---|---|
| 525,244 | Great Britain | Aug. 23, 1940 |